W. J. HAAS.
PORTABLE GRANARY.
APPLICATION FILED JULY 8, 1909.
953,827.
Patented Apr. 5, 1910.
2 SHEETS—SHEET 1.
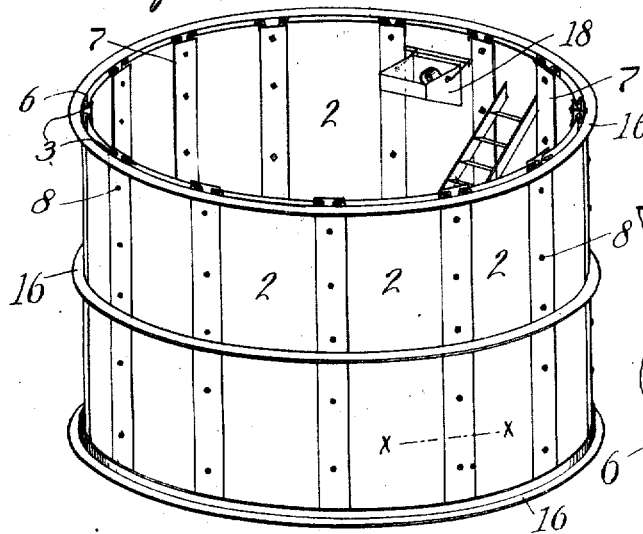
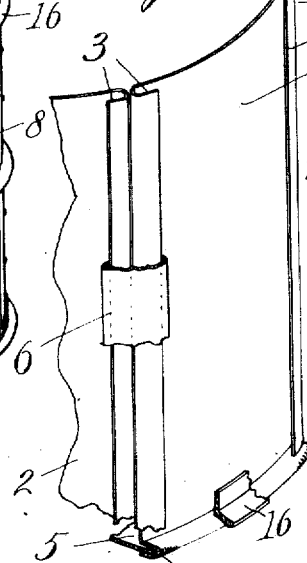
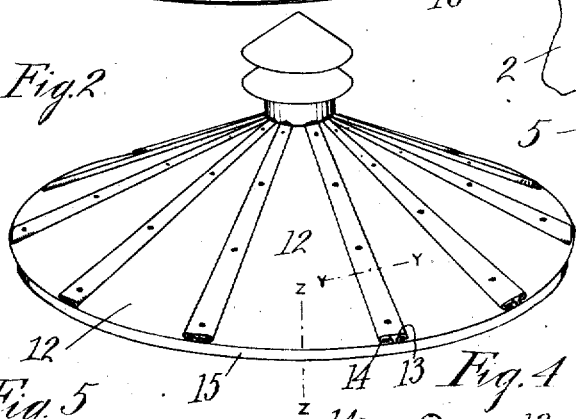
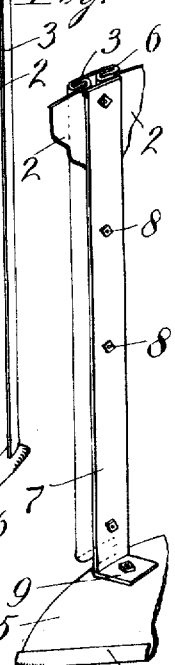
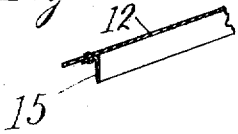
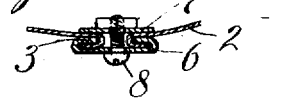
Witnesses,
George Voelker
H. Smith
Inventor,
William J. Haas
by Lothrop Johnson
his Attorneys.

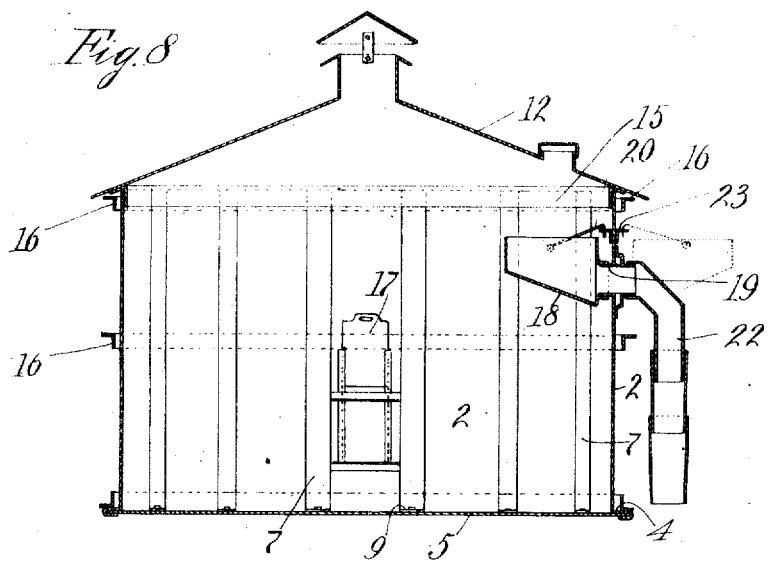
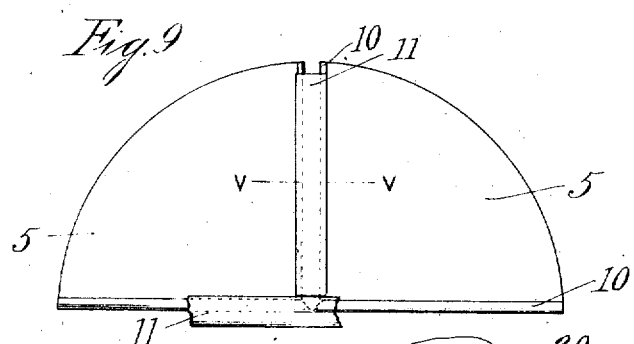
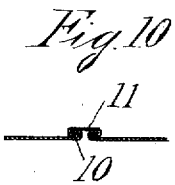
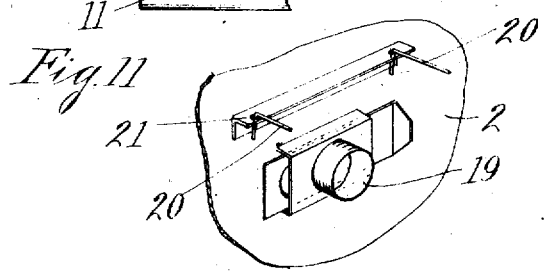

UNITED STATES PATENT OFFICE.

WILLIAM J. HAAS, OF ST. PAUL, MINNESOTA.

PORTABLE GRANARY.

953,827.     Specification of Letters Patent.     Patented Apr. 5, 1910.

Application filed July 6, 1909. Serial No. 505,997.

*To all whom it may concern:*

Be it known that I, WILLIAM J. HAAS, a citizen of the United States, residing at St. Paul, in the county of Ramsey and State of Minnesota, have invented certain new and useful Improvements in Portable Granaries, of which the following is a specification.

My invention relates to improvements in a portable granary and has for its object to provide a simple form of sectional sheet metal granary with improved means for joining together the sections.

To this end my invention consists in the features of construction and combination hereinafter described and claimed.

In the accompanying drawings forming part of this specification: Figure 1 is a perspective view of my invention, Fig. 2 is a similar view of the cover, Fig. 3 is a view on line $x$—$x$ of Fig. 1, Fig. 4 is a view on line $y$—$y$ of Fig. 2, Fig. 5 is a section on line $z$—$z$ of Fig. 2, Fig. 6 is a perspective view of two of the wall sections and joining means broken away, Fig. 7 is an inside view of the illustrated joining means of the wall section, Fig. 8 is a vertical section through the bin; Fig. 9 is a plan view of a portion of the bottom, Fig. 10 is a section on line $v$—$v$ of Fig. 9, Fig. 11 is an interior view of a portion of the bin.

As shown in the drawings the wall of the bin is made up of a plurality of sections 2, the side edges 3 being rolled outwardly and back upon the sections, and the lower edge 4 being turned outwardly and then inwardly to form a groove to receive the outer edges of the bottom section 5. The side edges of the wall sections 2 are joined together by a union 6 having inturned edges to receive the bent edges 3 and to cause said union to slip downwardly over the same. With the union 6 in place a strip 7 is placed in position across the joint between adjacent sections on the inner side of the bin and connected with the union 6 by bolts 8. The bottom is secured to the wall sections by having its outer edge slipped into the grooved lower edges 4 of the wall sections and by having the lower ends 9 of the strips 7 bolted to said bottom. The adjacent edges of the bottom sections are doubled upon themselves as shown in Fig. 10 to form hooked flanges 10 over which is slipped unions 11, corresponding with unions 6. Similarly the top is made up of sections 12, the edges of the sections being bent to form hooked flanges 13 over which slide the unions 14, corresponding with the unions 6. The top is further formed with a suitable circumferential flange 15 to fit inside the bin. The bin may be strengthened by a series of surrounding rings 16. A slide 17 is used in connection with one of the side walls to allow access to the bin.

To allow filling of the bags from the bin I provide a hopper 18 removably fitted over a tube 19 extending through the side wall of the bin, the hopper being suitably supported as by means of arms 20 hinged to the hopper and detachably supported upon a bracket 21 secured to the interior of the bin. Discharge tubes 22 may be removably fitted over the outer end of tube 19. To allow filling of the bin the discharge tubes may be removed and the hopper 18 supported upon the outer end of the tube 19 as indicated by dotted lines in Fig. 8, a bracket 23 being supported upon the outer wall of the bin to receive the hopper arms 20.

By the use of my improved sectional construction and means for joining the different parts together, I secure a bin that is very easily set up, very strong and durable, and with which there is no chance of leakage.

I claim:

1. A bin of the class described comprising a plurality of wall sections having their adjacent edges turned outwardly and backwardly to form hooked flanges, plates having inwardly hooked edges fitting over said flanges, reinforcing strips covering the joints between said sections upon the opposite sides from said plates, the edges of said reinforcing strips overlapping the edges of the hooked plates for the purpose set forth.

2. A bin of the class described comprising a plurality of wall sections having their adjacent edges turned outwardly and backwardly and having their bottom edges extended outwardly and doubled inwardly to form an external hooked flange upon the bottom of said wall, plates having inwardly hooked edges slidably fitted over the adjacent flanges of the sections, reinforcing strips upon the inner sides of the sections, means connecting said slidable plates and said strips, and bottom sections having their outer edges extending into the hooked flanges carried by the lower edge of said wall.

3. A bin of the class described comprising a plurality of wall sections having their outer edges turned outwardly and backwardly to form hooked flanges, plates having inwardly hooked edges fitting over said flanges, reinforcing strips covering the joints between said sections upon opposite sides from said plates, bottom plates, means carried by the lower edges of the wall plates for receiving the edges of said bottom plates, and a plurality of reinforcing rings surrounding said bin.

In testimony whereof I affix my signature in presence of two witnesses.

WILLIAM J. HAAS.

Witnesses:
H. S. JOHNSON,
H. SMITH.